United States Patent [19]

Moscovitch

[11] Patent Number: 5,160,075
[45] Date of Patent: Nov. 3, 1992

[54] SKICASE AND COOPERATING HOLDERS

[75] Inventor: Jerry Moscovitch, Ontario, Canada

[73] Assignee: EDI Industries Ltd., Tornoto, Canada

[21] Appl. No.: 570,208

[22] Filed: Aug. 20, 1990

[51] Int. Cl.$^5$ .......................... A63C 11/00; B60R 9/12
[52] U.S. Cl. ...................... 224/328; 294/147; 280/814; 206/315.1; 206/591; 224/917; 16/112; 16/115
[58] Field of Search ............. 294/147, 142, 143, 145, 294/146, 159, 160, 162; 280/814, 815; 224/327-331, 316, 318, 319, 309, 314, 315, 321, 325, 326, 322-324, 917, 202, 42.03 A; 211/70.5; 206/315.1, 449, 451, 454, 585, 586, 591, 592, 112, 115, 110 R, 110.5, 126; 190/18 A, 18 R

[56] References Cited

U.S. PATENT DOCUMENTS

| 2,234,487 | 3/1941 | Davis | 280/815 |
| 2,645,334 | 7/1953 | Aldridge | 206/591 |
| 3,447,195 | 6/1969 | Bush | 16/115 |
| 3,767,036 | 10/1973 | McLeod | 206/315.1 |
| 3,779,568 | 12/1973 | Wakabayashi | |
| 3,780,487 | 12/1973 | Munson | 206/592 X |
| 3,837,548 | 9/1974 | Nerger | 206/315.1 |
| 3,861,701 | 1/1975 | Aring et al. | |
| 4,084,735 | 4/1978 | Kappas | 224/324 X |
| 4,126,254 | 11/1978 | Sahakian | 206/315.1 |
| 4,161,268 | 7/1979 | Heil | 206/315.1 |
| 4,172,522 | 10/1979 | Muller et al. | 206/315.1 |
| 4,262,798 | 4/1981 | Raab | 206/315.1 |
| 4,268,050 | 5/1981 | Kennedy, Sr. | 280/814 X |
| 4,358,137 | 11/1982 | Gramm | 280/814 |
| 4,361,347 | 11/1982 | MacIntyre | 280/814 |
| 4,380,290 | 4/1983 | Luebke | 206/315.1 |
| 4,387,840 | 6/1983 | Popeney | 224/314 |
| 4,516,709 | 5/1985 | Bott | 224/315 |
| 4,602,715 | 7/1986 | Sarver et al. | 206/591 X |
| 4,676,417 | 6/1987 | Hirschkoff | 224/202 |
| 4,733,806 | 3/1988 | Shoop | 224/202 |
| 4,860,935 | 8/1989 | Paylinsky | 224/202 |
| 4,867,307 | 9/1989 | Boyee | 206/315.1 |
| 5,096,104 | 3/1992 | Wirth | 224/202 X |

FOREIGN PATENT DOCUMENTS

| 326542 | 12/1975 | Austria . | |
| 0846621 | 7/1970 | Canada | 224/328 |
| 1116141 | 1/1982 | Canada | 224/917 |
| 3023172 | 1/1982 | Fed. Rep. of Germany . | |
| 7515124 | 1/1977 | France | 280/814 |
| 2497742 | 1/1982 | France . | |
| 0243364 | 12/1946 | Switzerland | 280/814 |
| 8603720 | 7/1986 | World Int. Prop. O. . | |

OTHER PUBLICATIONS

Mechanix Illustrated, pp. 888-889, Jan. 1973.

Primary Examiner—Henry J. Recla
Assistant Examiner—Casey Jacyna
Attorney, Agent, or Firm—Mirek A. Waraksa

[57] ABSTRACT

A compact case for retaining a pair of skis and a pair of ski poles has two internal open-ended pockets which retain skis in side-by-side reversed orientations with their bindings nested. Mechanisms are secured to the case between the pockets to engage the bindings of the skis to prevent displacement along the pockets, and structures bear on the skis when the case is closed to press the skis into the pockets. Sets of clips retain the poles in spaced-apart planes located between the skis. The poles are oriented in a compressed X configuration (in side view) crossing over proximate to the bindings of the skis with their basket-bearing ends directed inwardly into the space between the skis and with the handle of each pole inset longitudinally from both the handle and the basket of the other pole. The exterior of the case is molded with forward and rear sets of parallel alternating grooves and ribs. Holders with complementary sets of grooves and ribs are adapted to be mounted on a vehicle roof rack and to receive two such case in side-by-side relationship. The sets of grooves and ribs of the holders and cases are interlocked to prevent displacement of the case relative to the vehicle.

15 Claims, 12 Drawing Sheets

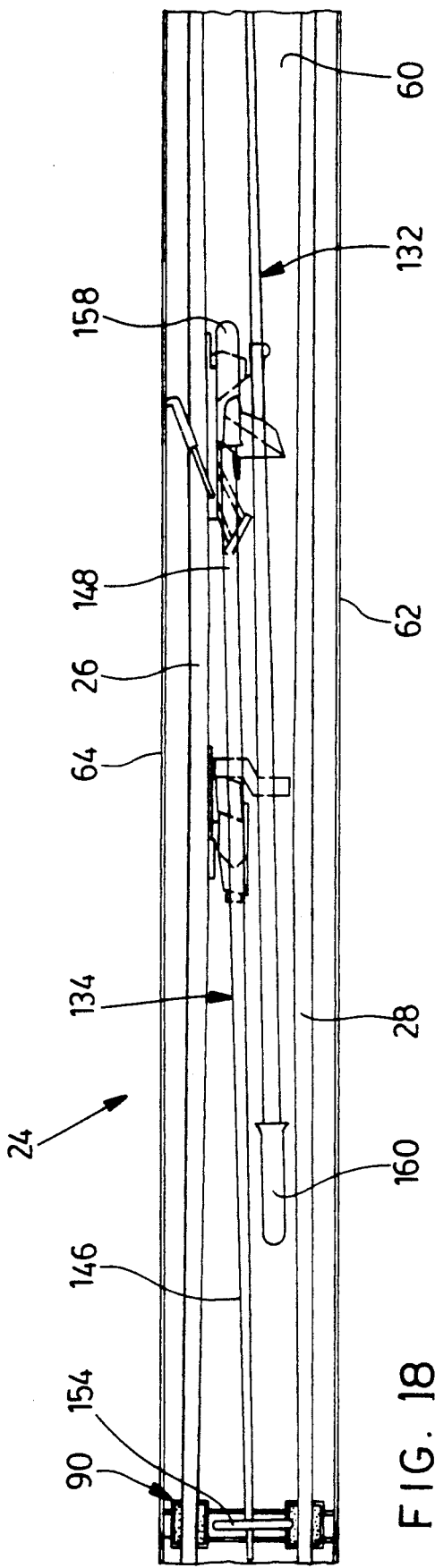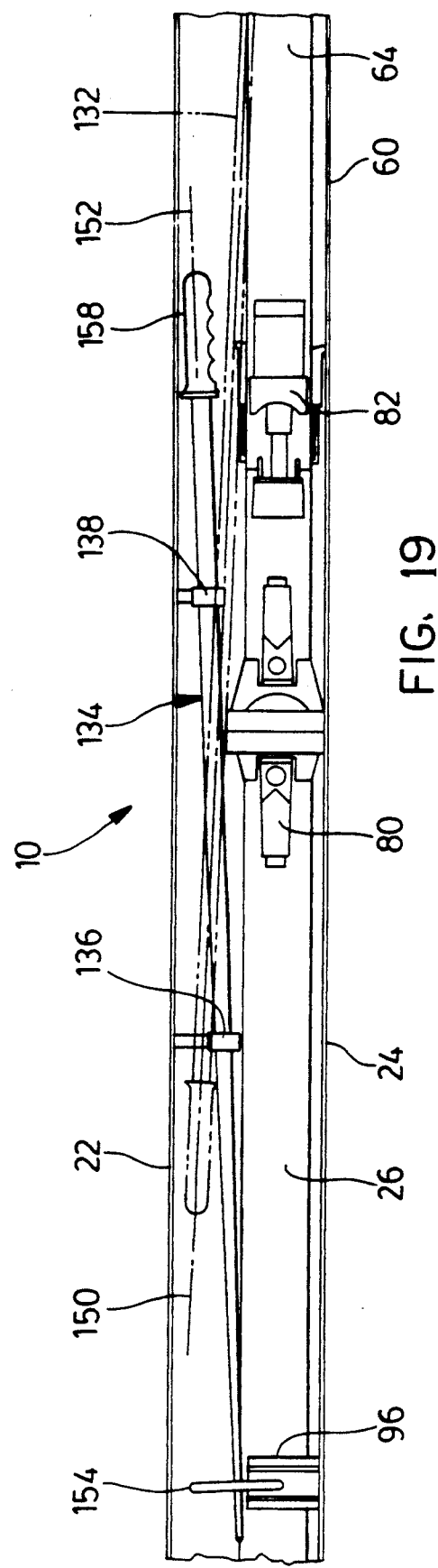

SKICASE AND COOPERATING HOLDERS

FIELD OF THE INVENTION

The invention relates generally to storage and transportation of skis and ski poles.

BACKGROUND OF THE INVENTION

Carriers are commercially available for purposes of transporting a pair of skis. A very common form is a flexible zippered bag with carrying straps. One ski may be strapped in place in the interior of the bag while the other is free or the pair of skis may be bound together with elastomeric fasteners and placed as a single unit into the bag. Ski poles are generally placed loosely into the bag together with the skis. A compact carrier is also available which clamps a pair of skis bottom-to-bottom, centrally along the skis, and provides a pivoting handles by means of which the skis can be carried.

One problem associated with such carriers is that the skis are contacted with one another or other ski equipment. The edges of skis are often sharpened to enhance control, and bottom surfaces are generally polished to enhance speed. The contacting of the skis with themselves and with other equipment creates a risk of damage to ski edges, surfaces and bindings. If skis are to be transported by aircraft, there is an even greater risk of damage from contact with other items of cargo and more generally from the rough handling which items of cargo tend to receive.

On automobiles, it is common to provide a special roof rack to receive skis. The roof rack comprises a pair of stationary cross-members and mounting assemblies with suction cups and straps that fasten the cross-members to the roof of a vehicle. The two cross-members are often formed with grooves arranged in axially aligned forward and rear pairs that receive skis individually. Upper retaining members are hinged to the cross-members and can be pivoted downwardly onto the skis and then locked to retain the skis. Elastomeric pads have been used to cushion the skis and avoid damage to ski surfaces and edges. Although somewhat protected, the skis remain exposed to debris thrown up by traffic and to the elements. Also, once the vehicle arrives at a desired destination, one may still require some means to transport the skis by hand.

A variety of ski carriers have been proposed in prior patents located in prior art searches for the present invention. U.S. Pat. Nos. 3,861,701 to Aring et al, 3,779,568 to Wakabayashi, and 4,358,137 to Gramm propose wheeled carriers in which skis are bound together with bottom surfaces contacted. A number of low-cost holders have also been proposed. U.S. Pat. No. 4,172,522 to Muller et al, for example, proposes a folding carrier in which skis are laid one on top another, but appears to make no provision for bindings associated with skis. U.S. Pat. No. 4,161,268 to Heil proposes a telescopic carrier which receives skis bound to one another with their bottom surfaces contacted. U.S. Pat. No. 4,380,290 to Luebke proposes a tubular compartment suitable for retention of skis, which comprises a slidable partition for adjusting compartment size, the skis apparently being nested or contacted within the compartment. A number of prior patents propose rigid cases that would offer better overall protection. U.S. Pat. No. 3,837,548 to Nurger proposes a lengthwise extendible case with straps for securing skis in a variety of configurations. U.S. Pat. No. 4,126,254 to Saahakian proposes a rigid ski case in which skis are in side-by-side relationship with the bottom ski surfaces resting against a common supporting surface. U.S. Pat. No. 3,767,036 to McLeod proposes a rigid container for transporting skis in which skis are bent and maintained in a tensioned state in slots formed in foam masses. None of the prior ski carriers involving a rigid case appears to have receive any commercial acceptance.

One reason that prior rigid ski cases have not been commercially successful is likely that they are unwieldy. They are inherently long because of the nature of the product which must be stored. The size problem is aggravated considerably by the need for large cross-sectional dimensions to accommodate the bent forward portions of the skis and the presence of bindings. Given the necessary length of such a case, even small increases in cross-sectional dimensions can result in very substantial increases in overall volume. The size problem is further aggravated if ski poles are to be retained, particularly in view of the relatively large diameter of the baskets that are commonly associated with such poles.

BRIEF SUMMARY OF THE INVENTION

In one aspect, the invention seeks to reduce the volume of space which a pair of skis necessarily occupies within a rigid case, specifically the cross-sectional dimensions of that space transverse to its length. The skis may be of the common type having a forward bent end portion, a central portion with a binding comprising a toe piece and heel piece for receiving a ski boot, and rear end portion. The inventor has noted that the centre point of each ski binding is normally offset from the actual longitudinal centre of the associated ski. By directing the skis in opposite directions so that the curved forward end portions of the skis are distant from one another, he has been able to bring the skis together with their bindings "in nested relationship", which expression as used in this specification means that one component of the binding of each ski (generally the toe piece) is positioned between the toe and heel pieces of the other ski and the skis sufficiently close that the bindings are transversely overlapped, appearing to overlay one another when view along the longitudinal (lengthwise) axis of the case. This arrangement very significantly reduces the cross-sectional dimensions of the space occupied by the skis without necessarily increasing the overall length of the case. The cross-sectional dimensions of the case can consequently be reduced significantly relative to prior ski cases or alternatively a larger number of skis can be retained in a single larger case.

In another aspect, the invention provides a case for retaining a pair of skis and a pair of ski poles which comprises a pair of elongate rigid case portions, means joining the case portions such that case can be opened and closed, and means for securing the case portions in a closed orientation. Means are provided for releasably retaining the skis within the compartment in substantially parallel relationship and oriented in opposite directions and with the forward bent portions of the skis in transversely overlapping relationship. For purposes of this specification, the term "transversely overlapping relationship" as used in respect of the forward bent end portions of a pair of skis should be understood as meaning that the forward bent end portions appear to overlap one another transverse to the longitudinal axes of the skis or the associated ski case, as when viewed along such axis or axes. The transverse overlapping reduces the space between the skis, but generally results in the region between the skis being obstructed by the presence of the ski bindings, whether nested or otherwise. Means are provided for releasably retaining the poles in planes in side-by-side relationship between the inserted skis with longitudinal axes of the poles in substantially an X configuration crossing over the bindings of the skis when viewed perpendicular to the planes. The basket-bearing end portion of each pole is directed inwardly into the space between the retained skis, thereby accommodating the relatively large dimensions of the basket. The handle of each pole is inset longitudinally from both the handle and the basket of the other pole and located proximate to the space between the skis. This arrangement can be exploited to reduce the overall cross-section of a case intended for a single set of skis and poles or to permit a greater number of sets to be located in a larger case.

In another aspect, the invention provides a ski case comprising a pair of elongate rigid case portions, means joining the case portions such that case can be opened and closed, and means for securing the case portions in a closed orientation. One of the case portions comprises means defining a longitudinal pockets. The pockets are configured such that a pair of skis are received in the pockets in substantially parallel relationship with the bent forward end portion of each ski in transversely overlapping relationship. Each pocket has an open longitudinal side permitting insertion of one of the skis edgewise into the pocket and an opposing obstructed longitudinal side. Each pocket comprises a pair of pocket portions shaped to locate about opposing faces of the ski and spaced-apart longitudinally to receive the binding of the ski between them with the received binding spaced forwardly from one pocket portion and rearwardly of the other pocket portion. Means are provided for engaging the inserted skis such that displacement of the skis relative to the pockets is prevented. Such means preferably comprise structures secured to the other case portion and positioned to engage edges of the skis facing outwardly of the pockets to press the skis firmly into the pockets as the case is closed. The pockets are open-ended and dimensioned such that the bent end portions of the skis are positioned longitudinally outwardly of the open ends of the pockets. The result is a relatively compact arrangement for retaining the skis and able to accommodate a wide range of skis of different configuration and length.

In another aspect, the invention provides apparatus for securing skis to a supporting structure for purposes of transportation or storage. The apparatus comprises a rigid ski case, preferably of the construction described above, and a holder shaped to locate about a portion of the ski case in an orientation transverse to the longitudinal axis of the ski case. The holder comprises first and second holder portions, means permitting the holder portions to be displaced between open and closed orientations such as hinges, and means for releasably securing the holder portions in their closed orientation. The ski case portion and the holder are formed with complementary locking structures shaped to interlock when the holder portions are displaced to the closed orientation about the ski case. The interlocking structures are preferably parallel alternating grooves and ridges formed on each of the ski case portion and the holder portions. Means are provided for use in securing the holder to supporting structure. If the skis are to be supported, for example, on a vehicle roof rack having rigid cross-members, U-shaped clamps may be fitted about one cross-member and threaded ends of the clamps may be received in apertures formed in the holder. Those apertures are preferably positioned such that the case (or cases) retained by the holder obstructs access to fasteners used to secure the threaded clamp ends, and the holder is preferably secured in its closed orientation with a combination or key-operated lock. For use with vehicles roof racks, it will generally be desirable to form the ski case with forward and rear interlocking structures and to provide forward and rear holders of the configuration described. The same apparatus may be used to store skis in a vertical orientation against a wall with the holder secured to the wall by means of bolts or screws.

Other aspects of the invention will be apparent from a description below of preferred embodiments of the invention and will be more specifically defined in the amended claims.

DESCRIPTION OF THE DRAWINGS

The invention will be better understood with the reference to drawings in which:

FIG. 18 is a side-elevation cross-section in a vertical plane further detailing the geometric relationship between the poles and the skis;

FIG. 19 is a fragmented plan view of one case portion of the case of FIG. 2 further detailing how bindings are engaged to prevent longitudinal displacement of the skis in the case pockets.

DESCRIPTION OF PREFERRED EMBODIMENTS

Figure 1:
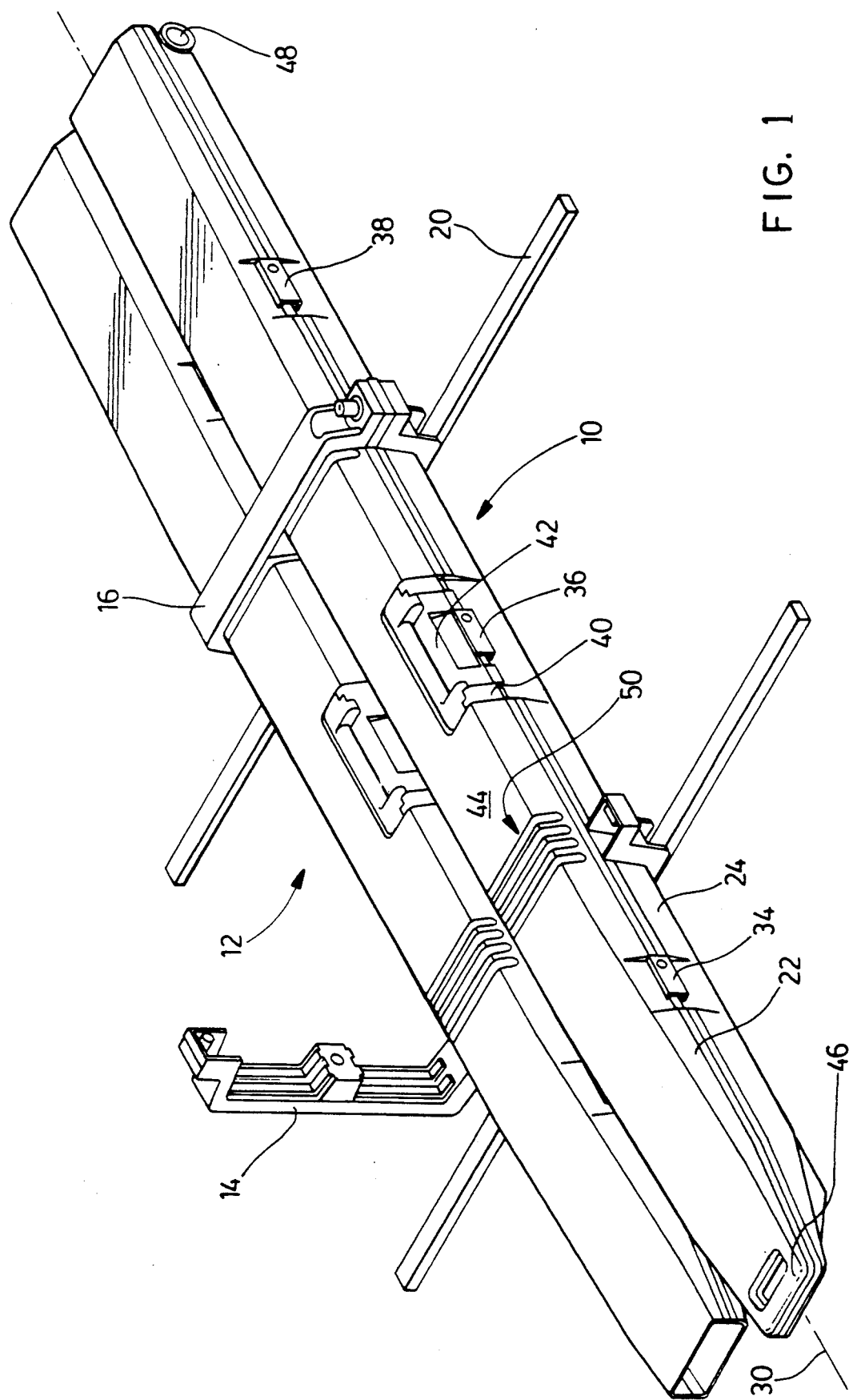
FIG. 1 is a perspective view of two identical ski cases embodying the invention mounted by forward and rear holders to a roof rack of a vehicle.

Reference is made to FIG. 1 which illustrates a pair of identical cases 10, 12 embodying the invention and each adapted to hold a pair of skis together with a pair of ski poles. The cases 10, 12 are illustrated with forward and rear holders 14, 16 adapted to secure the cases 10, 12 to a vehicle (not illustrated) having a roof rack. Only two elongate forward and rear cross-members 18, 20 of the roof rack have been illustrated, and it should be understood that these would be mounted to the roof of the vehicle as with convention mounting assemblies comprising suction cups and straps. The combination of holders 14, 16 and cases 10, 12 would be used to transport the skis to a desired remote location, fully protected. Thereafter, the cases 10, 12 permit the skis to be conveniently transported by hand, if required. In off-season, the holders 14, 16 may be mounted on a wall to store the associated skis.

The general configuration of the case 10 will be described with reference to FIGS. 1 and 2. The dimensions of the case are roughly as follows: the length is about 2.3 meters (90 inches), the width is about 17.1 centimeters (6¾ inches), and the height is about 15.2 centimeters (6 inches). The case comprises upper and lower, rigid, elongate case portions 22, 24 which are largely unitary plastic injection moldings. In the closed orientation of FIG. 1, the case portions 22, 24 define a closed elongate compartment dimensioned to receive a pair of skis 26, 28 oriented with the compartment's longitudinal axis 30 (indicated in FIG. 2). The two case portions 22, 24 are joined by three hinges which permit pivoting relative displacement of the case portions 22, 24 between the closed orientation of FIG. 1 and an open orientation apparent in FIG. 2 in which the compartment is accessible for receipt or removal of the skis 26, 28. Hinges may be molded with the two case portions 22, 24 in a conventional manner (such as the hinge 32 apparent in FIGS. 4 and 5) and appropriate pins provided to join the molded portions of the hinges. Three sliding locks 34, 36, 38 permit the case portions 22, 24 to be releasable secured in their closed orientation for transportation. The case can be carried by an individual, completely off the ground, by means of a pivoting segmented handle 40 which normally seats in a recess 42 substantially flush with the outer surface 44 of the case. To permit alternative towing of the case, a forward handle 46 is molded with the case portions 22, 24 at a forward end of the case and a pair of wheels are mounted in recesses at the rear of the case, such as an exemplary wheel 48. To reduce the length of the case, the forward handle 46 can be eliminated or alternatively formed. Forward and rear sets of alternating parallel grooves and ribs are formed on the exterior of the case in a circumferential orientation (only a forward set 50 being apparent and indicated in FIG. 1), and these are used in securing the case to the holders 14, 16.

Figure 2:
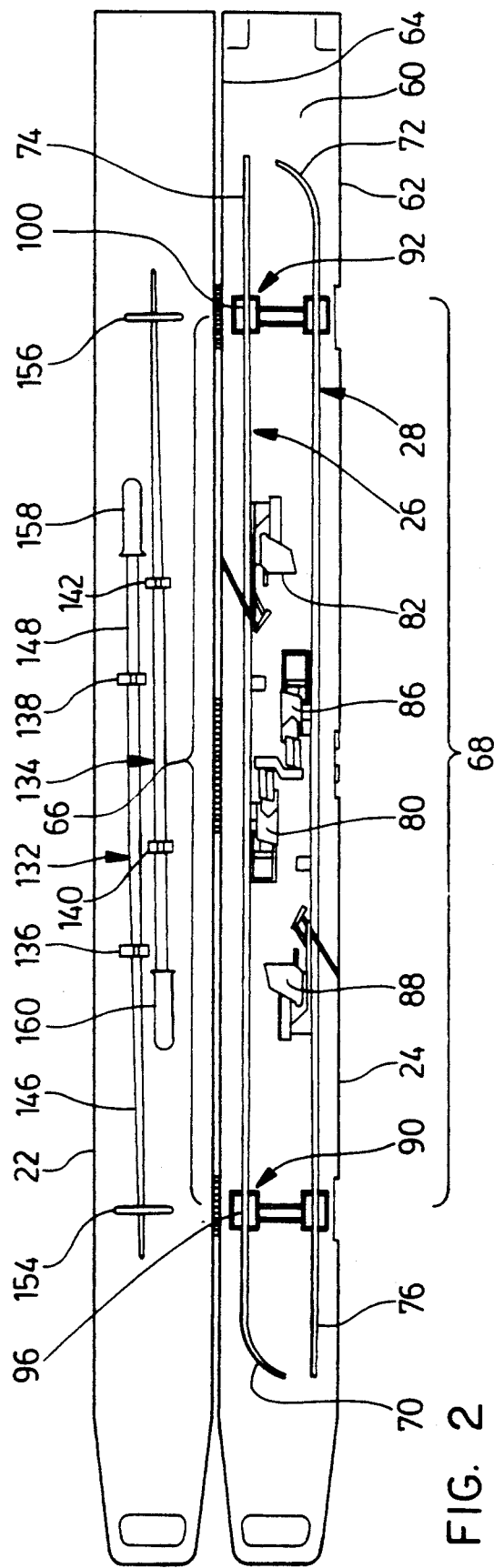
FIG. 2 is a plan view of one ski case in a open orientation indicating the relative positioning of the two skis as contained therein.

FIG. 2 illustrates the general configuration of the interior of lower case portion 24. It has an elongate longitudinal bottom wall 60 and a pair of longitudinal sides 62, 64, which together have a generally U-shaped cross-section transverse to the axis. It also comprises a pair of longitudinally directed, open-ended pockets 66, 68, for receiving the skis 26, 28. As apparent in FIG. 2, the pockets 66, 68 are configured to retain the skis 26, 28 in substantially parallel relationship (but in opposite longitudinal directions) with each of the forward bent end portions 70, 72 of each ski directed towards the rear end portion 74 or 76 of the other ski (such as the relationship between the forward end portion 70 of the ski 26 and the rear end portion 76 of the other ski 28). The ski 26 has a binding for retaining a ski boot, that binding comprising a toe piece 80 and a heel piece 82 which extends from one face of a central portion of the ski 26. The centre of the binding is positioned rearwardly of the longitudinal centre point of the ski 26. The binding of the other ski 28 has similarly oriented toe and heel pieces 86, 88. Accordingly, by orienting the skis 26, 28 in reverse directions, as illustrated in FIG. 2, the bindings are nested with one another. In particular, the toe piece of each ski is received between the heel and toe pieces of the other ski (the relationship between the toe piece 80 of the ski 26 and the toe piece 86 and heel piece 88 of the ski 28, being typical). The toe piece of one ski transversely overlaps the heel piece of the other ski (such as apparent in the relationship between the toe piece 80 and the heel piece 88) thereby accommodating the greater distance by which the heel pieces extend from their respective skis. In this instance, the forward bent end portions 70, 72 of the skis 26, 28 are incidentally located in transversely overlapping relationship. It will be noted that the length of the space occupied by the skis 26, 28 is not increased beyond the length of a single ski, but most significantly, the nesting of the bindings reduces the cross-sectional dimensions of that space. Absent the nesting of the bindings, the width of the case might be expanded by 5 centimeters (2 inches) or more, representing roughly a 25% increase in the overall volume of the case.

The pocket 66 which is typical is constructed to provide fairly universal application. It comprises forward and rearward pocket portions 90, 92, the construction of the forward pocket portion 90 being typical and apparent in FIGS. 4 and 5. The forward pocket portion 90 comprises a retaining structure 94 integrally moulded with the lower case portion 24 and reinforced in a conventional manner with webs (illustrated but not indicated). The retaining structure 94 is shaped to define a longitudinally-directed, open-ended slot 96 (a forward end of which constitutes a forward open end of the pocket 66 itself). The slot 96 is shaped to receive a generally U-shaped elastomeric member 98. As illustrated, the opposing faces of the ski 26 are closely received by the elastomeric member 98, but it should be noted that this would occur only with a ski of some predetermined maximal thickness. The pocket portions 90, 92 are dimensioned to loosely receive most conventional skis thereby permitting a wide range of skis to be received.

The rear pocket portion 92 has a substantially identical construction and defines another longitudinal slot 100 substantially aligned with that of the forward pocket portion 90. The upper open ends of the pocket portions 90, 92 together define a longitudinal open side of the pocket 66 through which the ski 26 can be inserted edgewise into the pocket 66. It should be noted that the forward pocket portion 90 receives the central portion of the ski 26 at a position spaced forwardly of the ski's bindings and the rear pocket portion 92 receives the central portion of the ski 26 at a position spaced rearwardly of the bindings. The binding is consequently received spaced from each of the forward and rear pocket portions 90, 92. This permits the position of the skis 26, 28 in the pockets 66, 68 to be selected at the time of insertion, particularly the position of the bindings, and facilitates the introduction of the binding of the second ski 28 in nested relationship. It also permits skis of different configuration to be received thereby providing more universal application. Also to that end, the pockets 66, 68 are open-ended thereby accommodating different ski lengths and different curvatures of the forward bent end portions 70, 72 which are located longitudinally outwardly of the pockets 66, 68. All these measures avoid the need to custom manufacture a case to the dimensions and shape of a particular set of skis. Additional pocket members covered with an elastically deformable material (such as the support member 102 of FIG. 6) and inserted into sockets molded with the lower case portion 24 (such socket 104 of FIG. 6) may be provided to further support the central portion of the ski 26. These are not strictly required and may be eliminated to reduce construction costs. It should be noted that the presence of such members may limit the extent to which different skis may be received because of differences in curvature of the central portion of the skis and for that reason have been constructed as removable elements. If desired, sheets of elastomeric material may be located on internal surfaces the bottom wall 60 where the bindings are normally positioned to provide additional cushioning.

Figure 4:
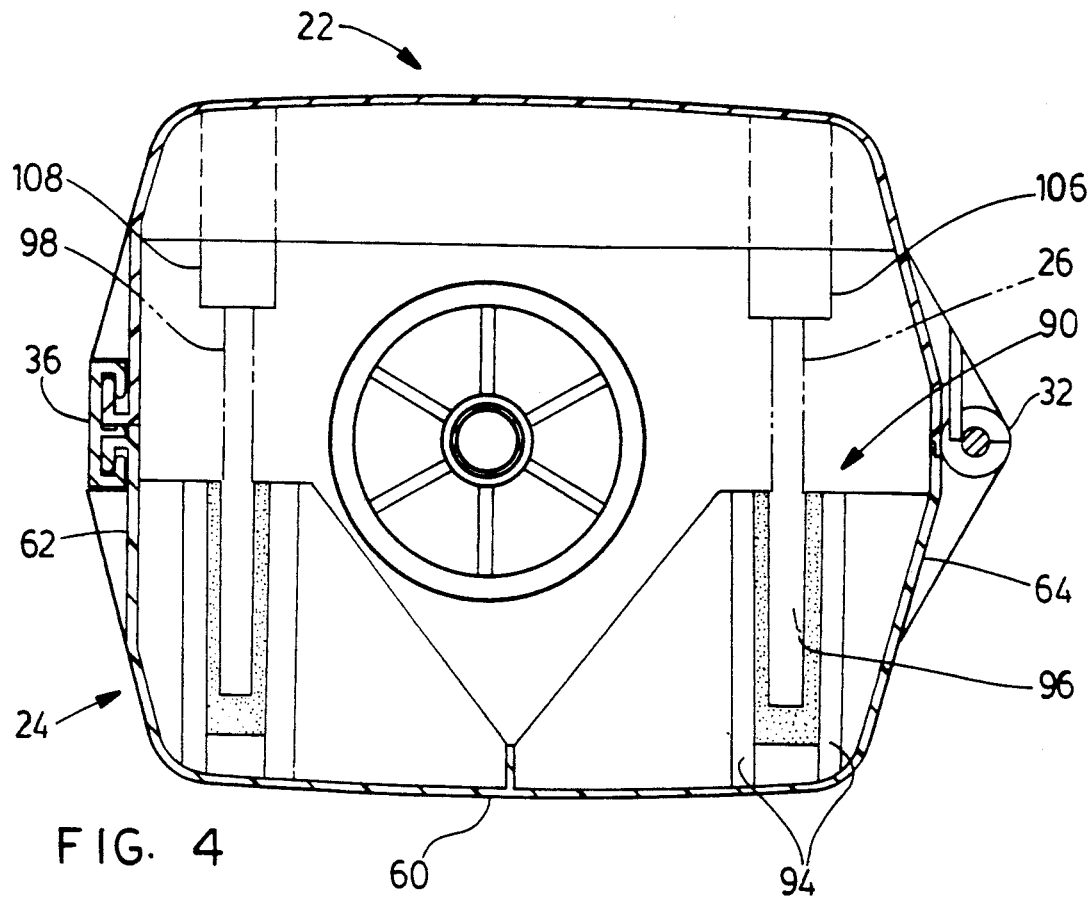
FIG. 4 is a cross-sectional view transverse to a longitudinal axis of the ski case of FIG. 2 illustrating how a pair of skis are retained in pockets associated with the case.
Figure 5:
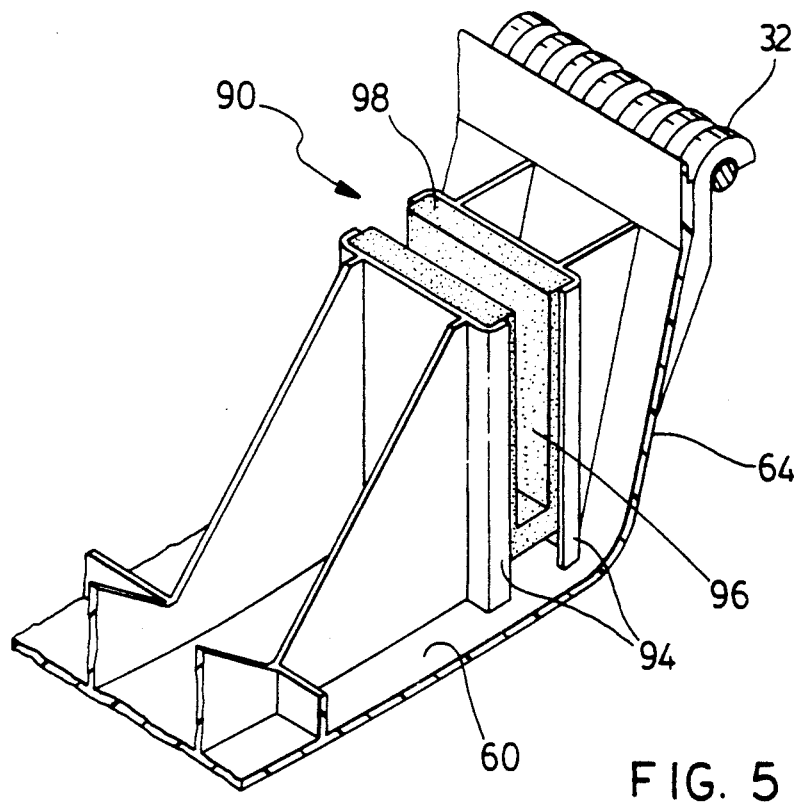
FIG. 5 is a perspective view further detailing the construction of the case of FIG. 2.

Structures 106, 108 apparent in FIG. 4 are moulded with the upper case portion 22 to ensure that the skis 26, 28 remain snugly seated within the pockets 66, 68. These structures 106, 108 are positioned to firmly engage outwardly facing side edges of the skis 26, 28 as the case portions 22, 24 are pivoted about the hinges to their closed orientation, effectively pressing the skis 26, 28 into the pockets 66, 68. The resilient U-shaped members in the pockets 66, 68 make exact dimensions of the closure structures 106, 108 less critical, but if desired, the closure structures 106, 108 may comprise resilient or elastically deformable portions defining outer structure surfaces intended directly to engage ski surfaces. Similar structures are molded with the upper case portion 22 towards the rear of the case.

Figure 6:
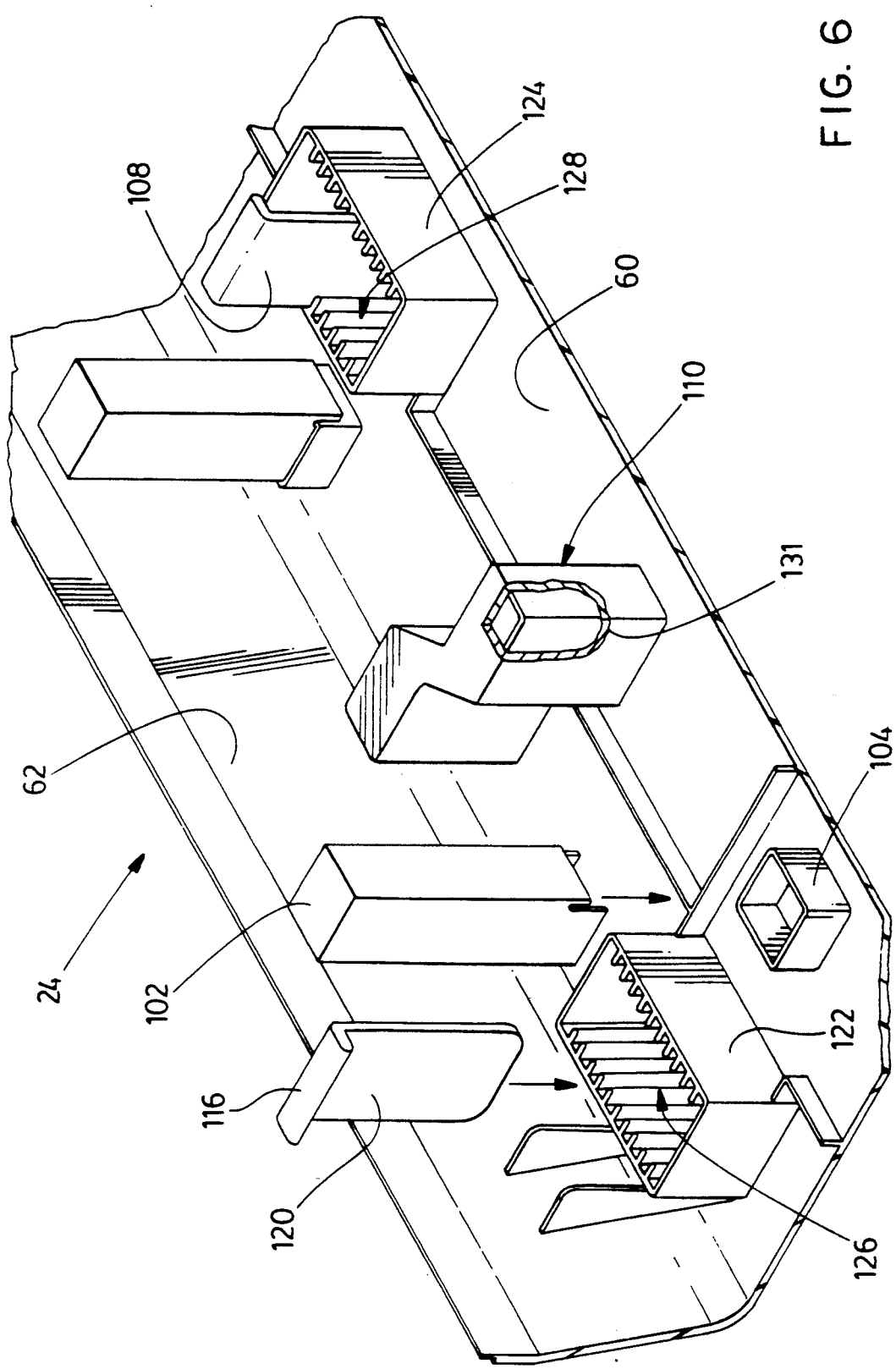
FIG. 6 is a fragmented perspective view illustrating means for locking against bindings associated with a ski to prevent longitudinal displacement of the ski relative to the pockets.
Figure 7:
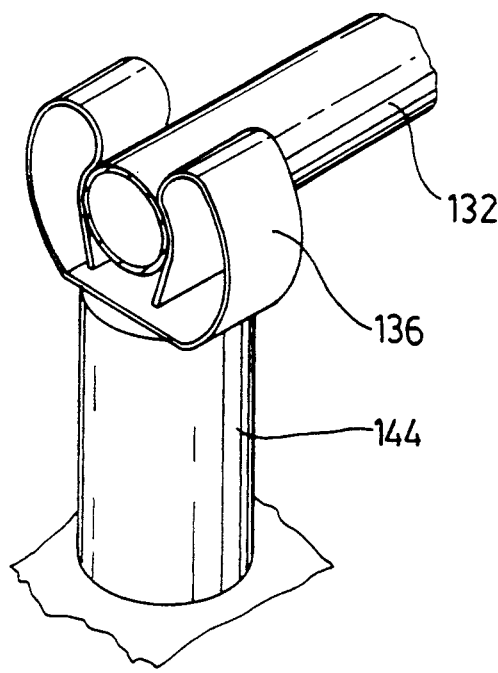
FIG. 7 is a perspective view of clips used to retain ski poles to one portion of the ski case of FIG. 2.

Although the structures 106, 108 will tend to keep the skis 26, 28 stationary in their respective pockets 66, 68, measures are taken specifically to prevent potential longitudinal displacement of the skis 26, 28. This is particularly significant in view of the nesting of the bindings and the consequent potential for the bindings to contact and damage one another with rough handling of the case. To that end, means are conveniently positioned between the pockets 66, 68 to engage the bindings to prevent longitudinal displacement. Such means are illustrated in FIG. 6 and 19, the latter view showing how the toe pieces 80, 86 of the respective skis 26, 28 are engaged. A stationary structure 110 is moulded with lower case portion 24 between the pockets 66, 68 and positioned such that rear surfaces 112, 114 of the toe pieces 80, 86 can be abutted against the stationary structure 110. The spacing of the forward and rear pocket portions 90, 92 is significant in that regard, permitting the longitudinal position of the bindings to be adjusted accordingly. Movable plastic abutment members 116, 118 are provided. The abutment member 116 which is typical is integrally molded with an elongate shank portion 120. Structures 122, 124 are molded with the bottom wall 60 proximate to each pocket and define a multiplicity of axially spaced-apart parallel slots, the two sets of slots being generally indicated with reference numerals 126, 128. Each of the slots is shaped to receive and retain the shank portions of the displaceable abutment members 116, 118 thereby permitting the abutment members 116, 118 to be positioned in various axial positions and engaged with the forward surfaces 129, 130 of the toe pieces 80, 86. An elastomeric cover 131 about the stationary structure 110 permits a snug fit. The arrangement is particularly convenient as it avoids increasing the volume of space required to hold the skis 26, 28. It will be apparent that other mechanisms for engaging the bindings can be provided.

Ski poles 132, 134 are stored between the two pockets 66, 68 in a manner which also avoids unduly increasing the cross-sectional shape of the case. It would be desirable to exploit the space already existing between the skis 26, 28 rather than requiring an expansion of the peripheral dimensions of the case. However, it will be noted that the space between the two skis 26, 28 is obstructed by virtue of the nesting of the bindings of the skis 26, 28. The particular problem is that the size of baskets potentially causes the poles 132, 134 to interfere with one another and also potentially causes the height of the box to be increased.

Figure 17:
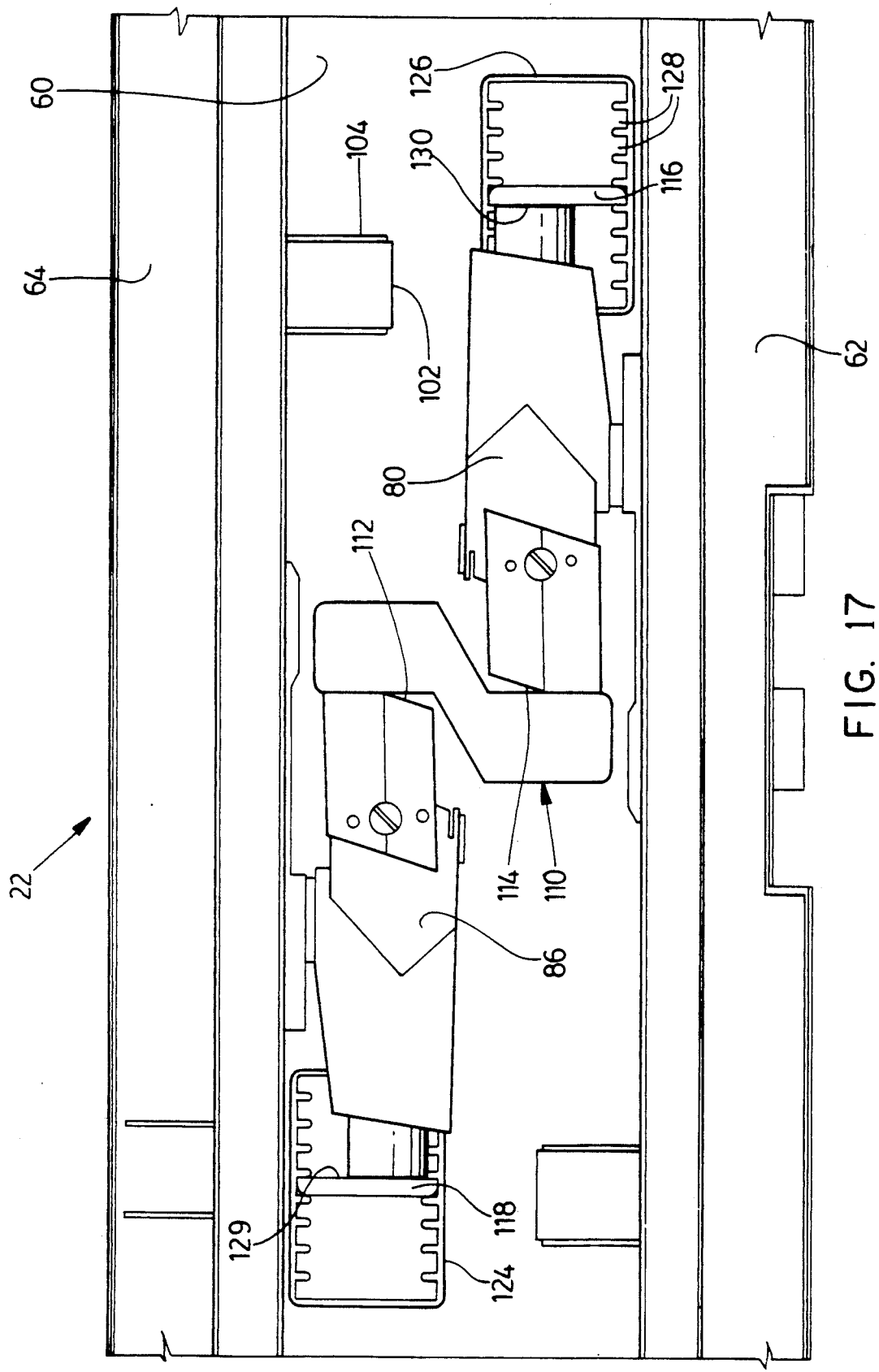
FIG. 17 is a fragmented plan view of one portion of the case of FIG. 2 further detailing the how ski poles are retained in the case.

The pole 132 is associated with a pair of clips 136, 138 and the pole 134 with a pair of clip 140, 142, which secure the poles 132, 134 to the upper case portion 22. The clip 136 which is typical if formed as a bent metal strip (preferably plastic-coated) and screwed to a projection 144 extending from the upper case portion 22. The pair 136, 138 is typical and comprises one clip 136 which receives the basket-bearing end portion 146 of the pole 136 and which is positioned a predetermined distance from the bottom wall 60 of the lower case portion 24 when closed. The other clip 138, mounted on a shorter support closer to the upper case portion 22, is spaced a predetermined smaller distance from the bottom wall 60 when the case 10 is closed, and receives the handle-bearing end portion 148 of the pole 136. The two pairs of clips are positioned such that the two poles 132, 134 are in side-by-side planes between the retained skis 26, 28 as apparent in the plan view of FIG. 17. The lengthwise axes 150, 152 of the poles 132, 134 are in an X configuration, crossing above the bindings, when viewed perpendicular to the side-by-side planes, as apparent in FIG. 18. The basket-bearing end portions of the poles 132, 134 are directed inwardly into the space between the skis 26, 28 thereby accommodating the large cross-sectional dimensions of the associated baskets 154, 156. Each of the handles 158, 160 of the skis 26, 28 is inset longitudinal from both the handle and basket of the other ski and remains proximate to the space between the skis 26, 28. This insetting of the handles 158 keeps the basket of each pole clear of the other pole and also has the effect of "compressing" the profile of the X-configuration to reduce height requirements. Accordingly, both poles 132, 134 are located between the planes of the skis 26, 28, but interference between the poles 132, 134 is avoided and undue expansion of the height of the box is avoided. It will be noted that the pair of poles 132, 134 appear angled in plan view relative to the longitudinal axis of the case 10. This has been done to reduce the degree to which the poles extend longitudinally to avoid interference with forward end portion of the case 10 which is tapered for esthetic and aerodynamic reasons and consequently has even further reduced cross-sectional dimensions.

Figure 8:
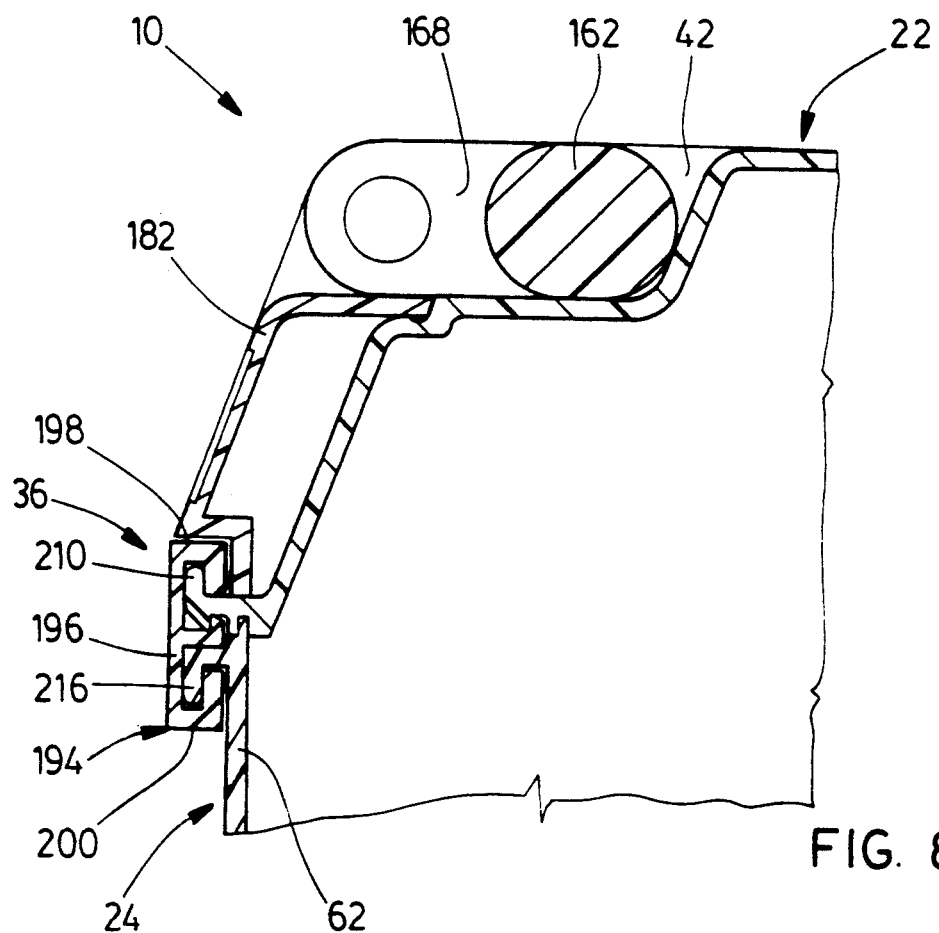
FIG. 8 is a cross-sectional view illustrating the orientation of a handle relative to a recess formed in the exterior of the case and also a sliding lock for securing the case in a closed orientation.
Figure 9:
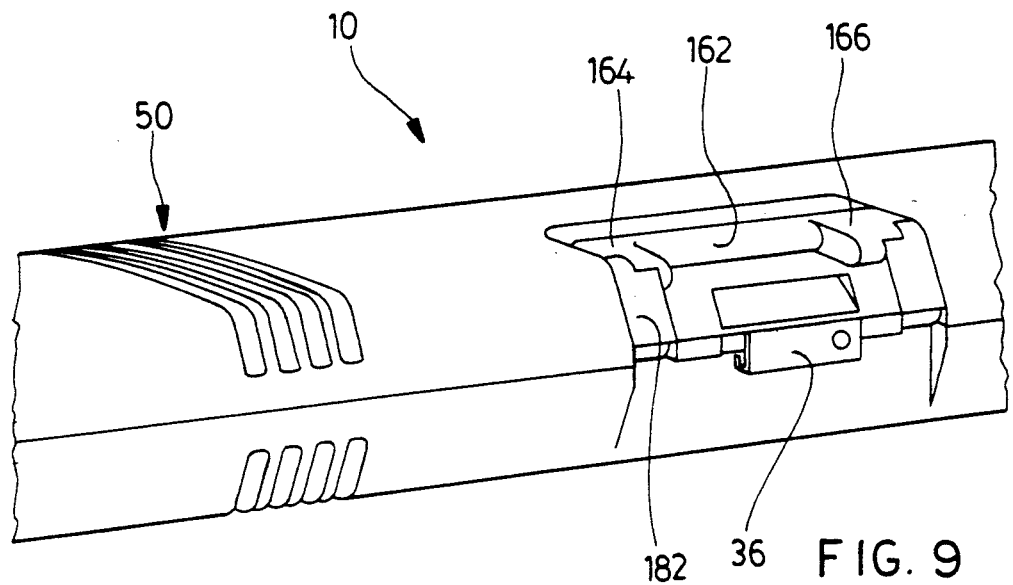
FIG. 9 is a fragmented perspective view of the handle.
Figure 10:
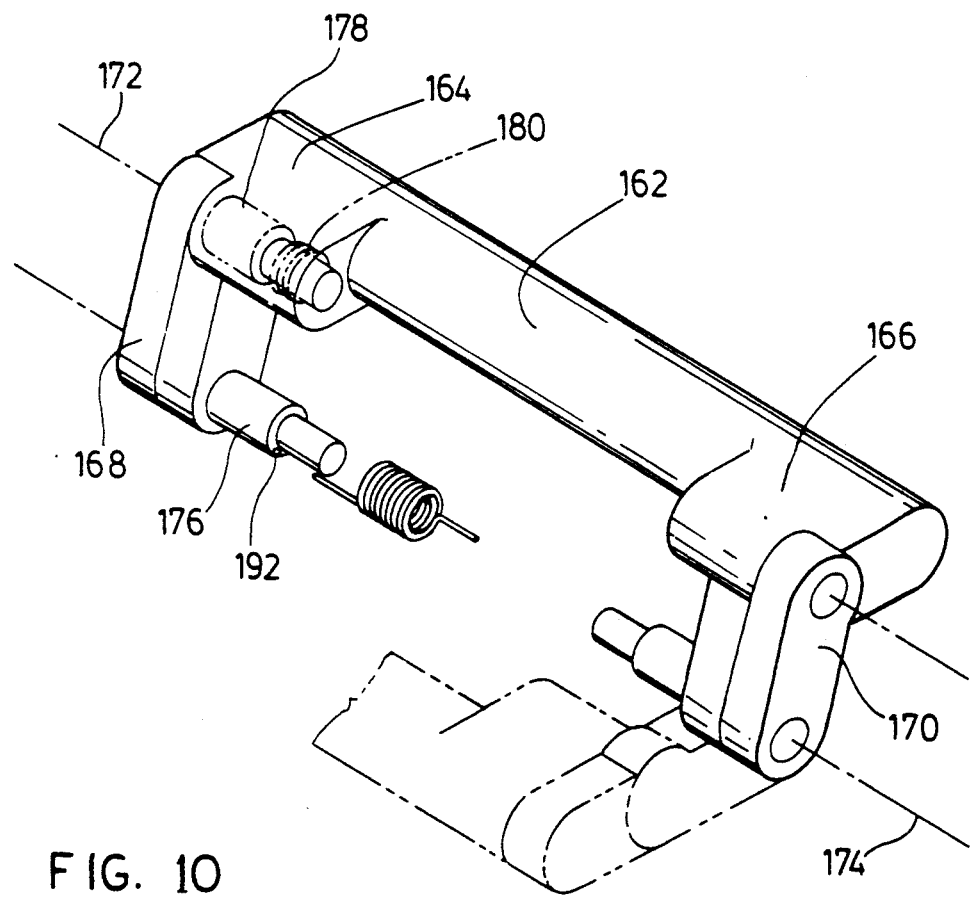
FIG. 10 is a fragmented perspective view, partially exploded, further detailing the handle.

The construction of the carrying handle 40 is apparent in FIGS. 8–10. It should be noted that the handle 40 is adapted to seat inconspicuously in a recess 42 formed in the circumferential sidewall of the case, as most apparent in FIG. 9. The handle 40 comprises a generally U-shaped handle portion 162 with a pair of generally parallel arms 164, 166. A pair of elongate handle extensions 168, 170 have end portions thereof hinged to the arm portions 164, 166 to permit the U-shaped handle portion 162 to pivot about a first hinge axis 172 relative to the handle extensions 168, 170. An opposite end of each handle extension is hinged to the case proximate to the recess 42 so that the handle extensions 168, 170 pivot together relative to the case 10 about a second hinge axis 174 parallel to the first hinge axis 172.

The hinges are formed by paired pins press-fit into recesses at either end of each of handle extensions 168, 170, such as the pair of pins 176, 178 associated with the handle extension 168. The pin 178 is received in a passage 180 of complementary shape in one arm portion of the U-shaped handle portion 162 while the pin 176 is received in a similar passage (not illustrated) formed in a case portion 182. Coil springs are mounted on each of the pins, the spring 184 associated with the pin 176 being typical. It is dimensioned to seat within a recessed distal end portion 186 of the pin 176. The end portions 188, 190 of the spring 184 are bent into parallel relationship such that one fits into a longitudinal groove 192 of the recessed distal end portion 186 and the other fits into an internal groove (not illustrated) in the casing portion 182, to obtain spring action. All four pins involved in the handle 40 are similarly fitted with springs. The arrangement permits the handle 40 to pivot between the orientation illustrated in solid outline in FIG. 9 and 10 in which the handle 40 seats within the recess 42 and an extended orientation illustrated in phantom outline in FIG. 2 in which a user can comfortably grip the handle 40. The recess 42 is circumferentially directed relative to the wall and seats the U-shaped handle portion 162 and the two handle extensions 168, 170 in a circumferential orientation substantially flush with the outer surface 44 of the case 10. The springs bias the U-shaped handle portion 162 and the handle extensions 168, 170 to pivot in the same angular direction about their respective hinge axis, towards the recess 42, tending to keep the handle 40 in the recess 42 once so located. This is particularly convenient if the case is to be shipped by aircraft in a cargo hold with other items. In use, the extension of the handle 40 beyond the sidewall of the case 10 allows even a hand with a heavy ski glove to grasp the handle 40 without interference from the case. To facilitate assembly, the case portion 182 located centrally in the recess 42 can molded as a separate unit and fastened with screws (not illustrated) to the case 10 thereby permitting the hinges and springs to be assembled outside of the recess 42. To reduce manufacturing costs, a more conventional handle with a single U-shaped member might be substituted.

A number of incidental matters should be noted. One sliding lock 36 used to secure the case portions 22, 24 when closed is illustrated in cross-section in FIGS. 8–10. The lock 36 includes a channelled slide 194 with a base portion 196 and parallel upper and lower undercut side portions 198, 200 defining essentially a T-shaped internal channel. The lower side portion 200 is discontinuous, being formed as two longitudinally spaced-apart segments 202, 204. A longitudinal projection is moulded with the base portion 196 and defines an upwardly extending lip 208 spaced from the base portion 196 and parallel to the both the base portion 196 and the side portions 198, 200. The upper case portion 22 is formed with a longitudinal upwardly-directed lip 210 oriented parallel to and spaced from the upper case. The lip is shaped to fit into the undercut of the upper slide side portion 198 in sliding relationship. The lower surface of the projection is formed with a longitudinal downwardly-opening recess 212 shaped to receive the upwardly extending lip 208 of the slide 194 also in sliding relationship. The lower case is formed with a structure defining a downwardly-directed discontinuous lip formed in two longitudinally spaced-apart segments 214, 216 shaped to slide 194 in the undercut of the lower slide side portion 200.

To assemble the lock 36, the upwardly directed lip on the upper case portion 22 is inserted into the undercut of the upper slide portion. The slide 194 is then pivoted downwardly to snap its centrally-located upwardly directed lip 208 into the downwardly-opening longitudinal recess 212 of the upper case portion 22. This secures the slide 194 in sliding relationship to the upper case portion 22. The slide 194 is then displaced to a left-most position (as viewed in the orientation of FIG. 9) in which the two segments 202, 204 of the lower slide side portion 200 are positioned to clear and locate in alignment with the two downwardly-directed lip segments 214, 216 of the lower case portion 24 as the case is closed. The slide 194 can then be displaced to a rightmost position interlocking the lip segments 214, 216 with the set of segments 202, 204 of the lower slide side portion 200 to resist opening.

Figure 11:
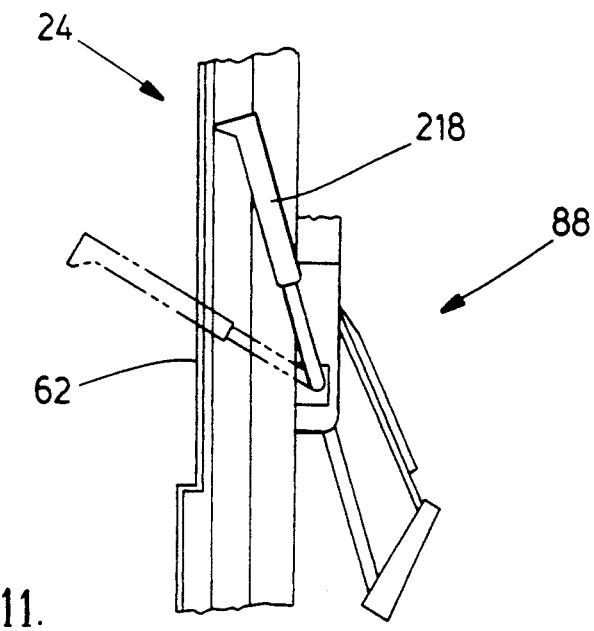
FIG. 11 is a plan view showing how a spring-biased brake lever associated with a ski is deflected by certain surfaces of the one ski case.
Figure 12:
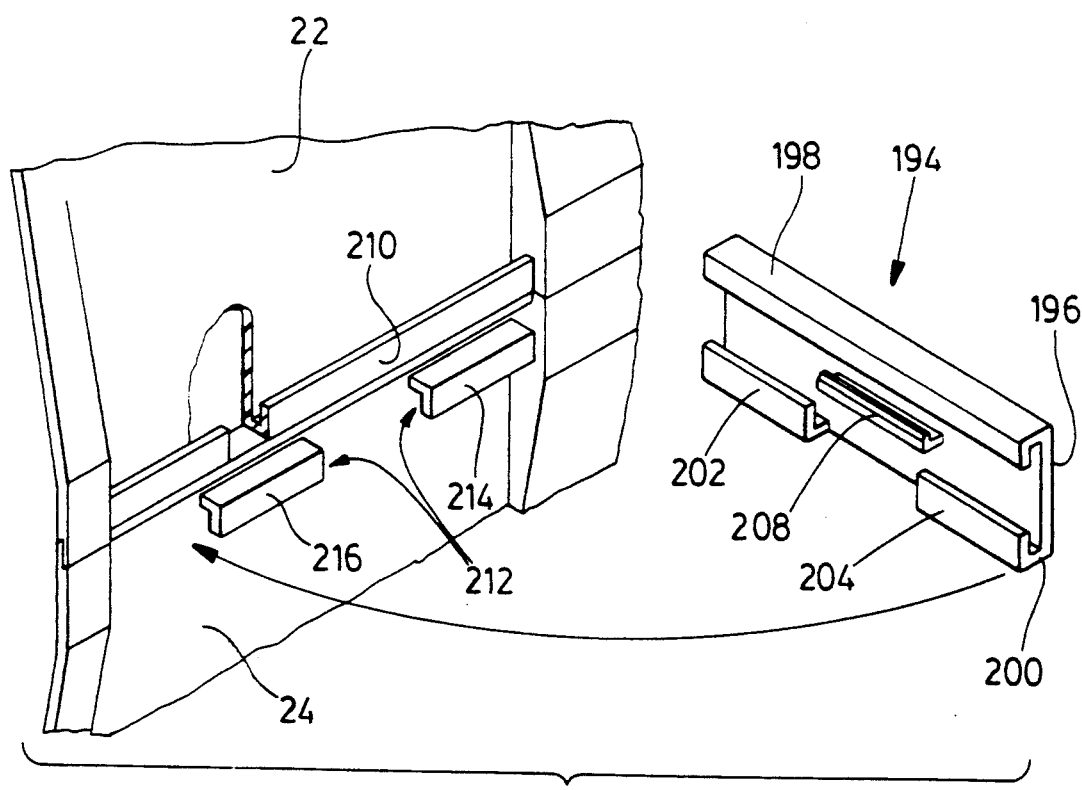
FIG. 12 is an exploded perspective view of a sliding lock associated with the case.

The skis 26, 28 have spring-biased brake levers which extend outwardly from the faces of the skis 26, 28 opposite to the faces to which the bindings are secured. A typical brake lever 218 associated with one ski 28 is shown in FIG. 11. When inserting the ski 28 into its pocket 68, the brake lever 218 is simply deflected by hand from its outwardly-extending position (shown in phantom in FIG. 11) towards the ski 28 and into engagement with an inner surface portion of the lower case portion 24.

To install the skis 26, 28 and poles 132, 134, the case is laid open as in FIG. 2. The poles 132, 134 are clipped to the upper case portion 22 with the basket-bearing end extending away from the upper case portion 22 and the handle abutted against the upper case portion 22. The abutment members 116, 118 are temporarily removed to avoid obstructing the skis 26, 28 as they are inserted. The skis 26, 28 are lowered edgewise into the pockets 66, 68 with the bindings in nested relationship, the brake levers being deflected by hand until they are positioned to lodge against the sidewall of the case. The longitudinal position of each ski is adjusted so that the rear surfaces 112, 114 of the toe pieces 80, 86 engage the stationary structure formed centrally in the lower case portion 24. The abutment members 116, 118 are then inserted into appropriate slots to bear against forwards surfaces of the skis 26, 28. The upper case portion 22 can then be pivoted over the lower case portion 24 and secured with the sliding locks 34, 36, 38. This process is reversed to remove the equipment.

Figure 3:
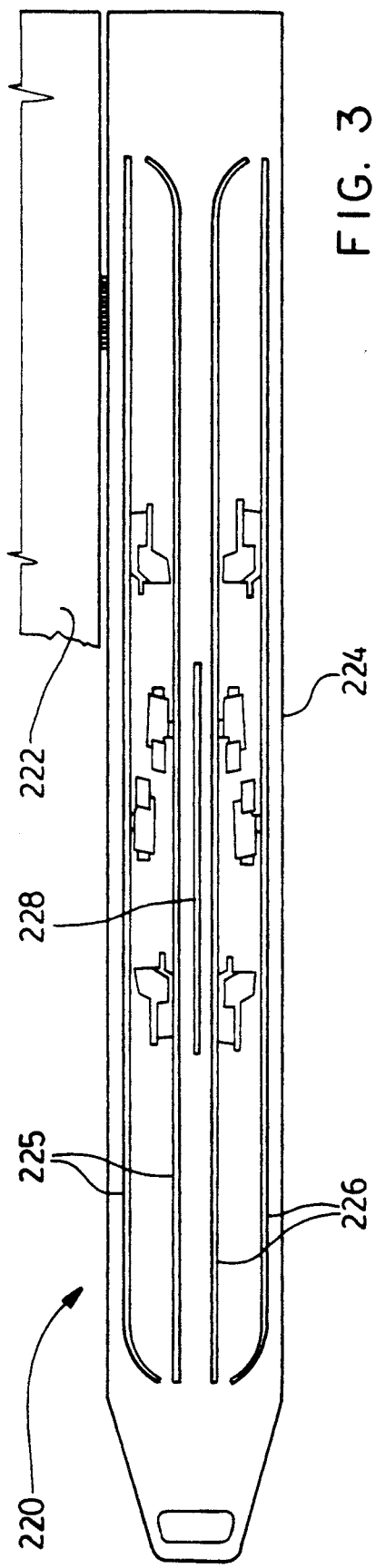
FIG. 3 is a plan view of a larger ski case adapted to hold two pairs of skis.

A larger case 220 is adapted to hold two pairs 225, 226 of skis as illustrated in FIG. 3. The general principles of configuration inherent in the smaller case 10 are embodied in the larger case 220, which accordingly has been illustrated only in general configuration and largely for the purpose of understanding certain sizing functions of the forward and rear holders 14, 16 described below. The case 220 comprises an upper case portion 222 (extensively fragmented) and a lower case portion 224 dimensions to receive two pairs 225, 226 of skis. The two pairs 225, 226 of skis are received in pockets (not illustrated) similar to those described with respect to the single-unit case 10. The bindings are nested and engaged by similar mechanisms (not illustrated) to prevent longitudinal displacement and the upper case portion 222 (extensively fragment) is formed with structures (not illustrated) to engage exposed edges of the skis to ensure that they remain within the pockets. To avoid dedicating space to the brake levers of the centermost skis, an upward partition 228 is molded with the lower case portion 224 and positioned to keep the brake lever of each of the innermost skis in a tensioned state and located proximate to the associated ski. The upper case portion 222 is formed with sets of clips (not illustrated) which retain two pairs of ski poles (not illustrated) in X configurations between the associated pairs 225, 226 of skis. The sidewall of the case is formed with forward and rear sets of parallel alternating grooves and ribs (not illustrated) identical to those of the single-unit case, except that the dimensions at the upper and lower faces of the case are greater.

Figure 13:
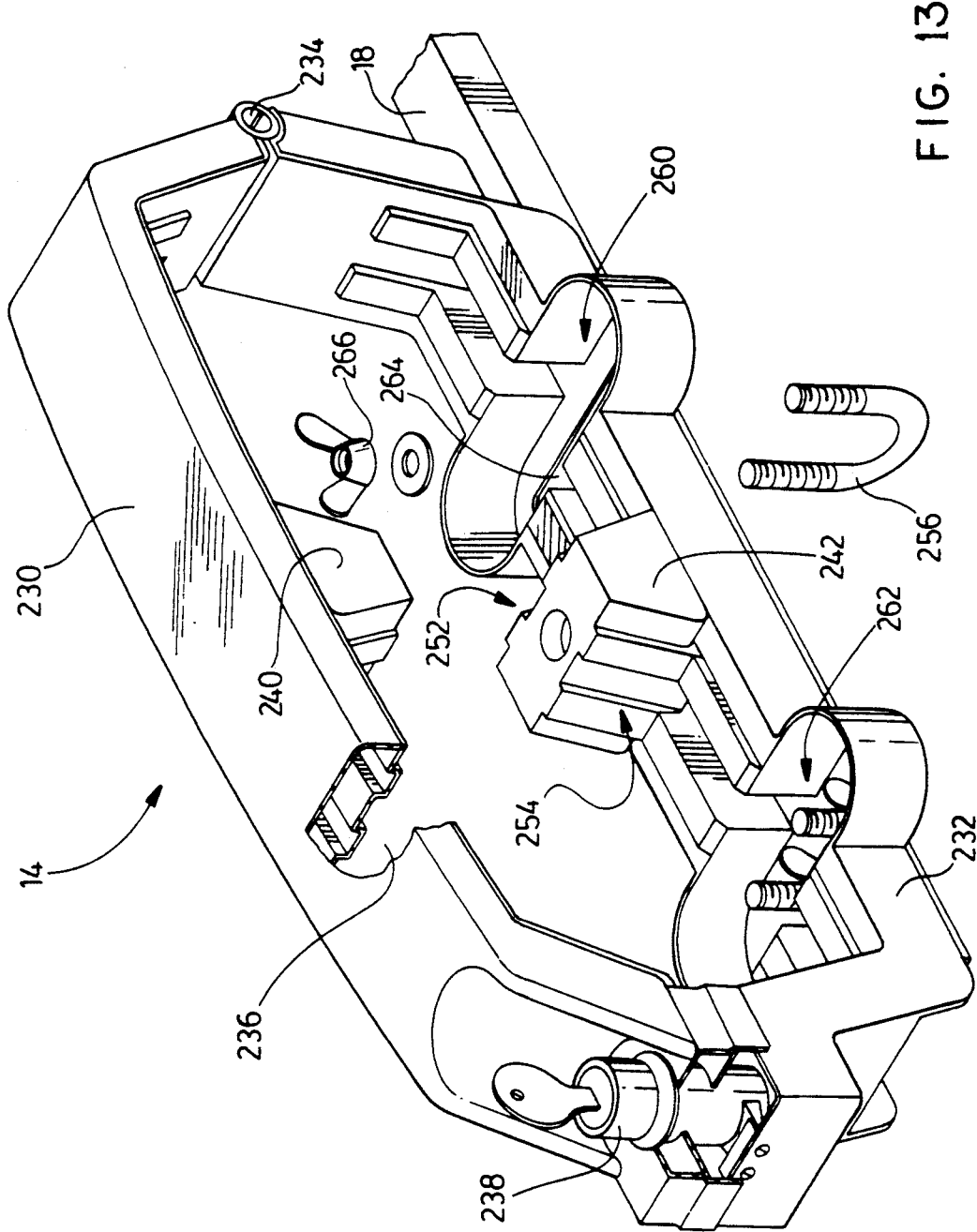
FIG. 13 is a perspective view of one of the holders of FIG. 1.
Figure 14:
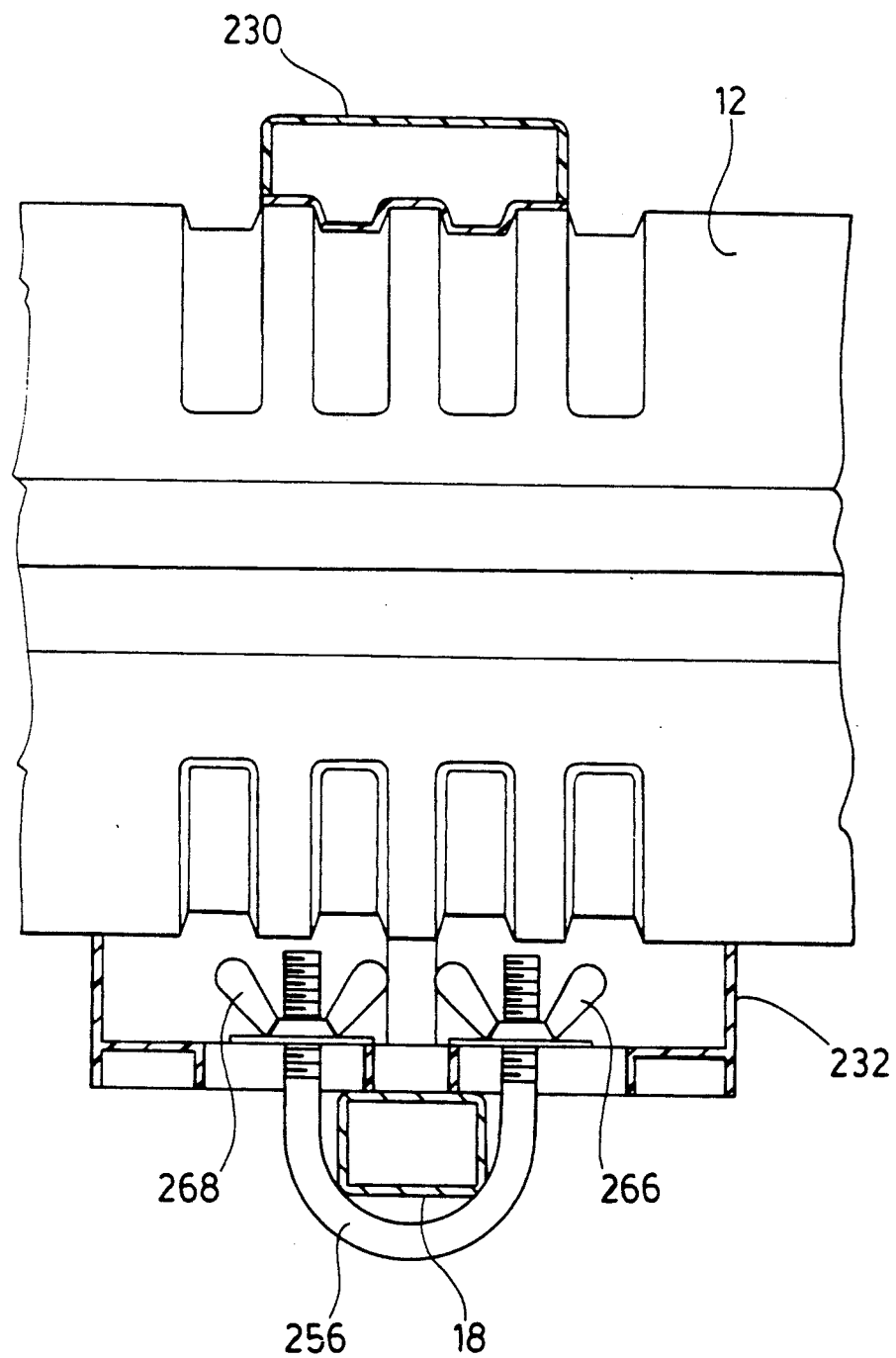
FIG. 14 is a side elevational view in partial cross-section indicating the cooperation between complementary locking structures formed on the holder and a ski case.
Figure 16:
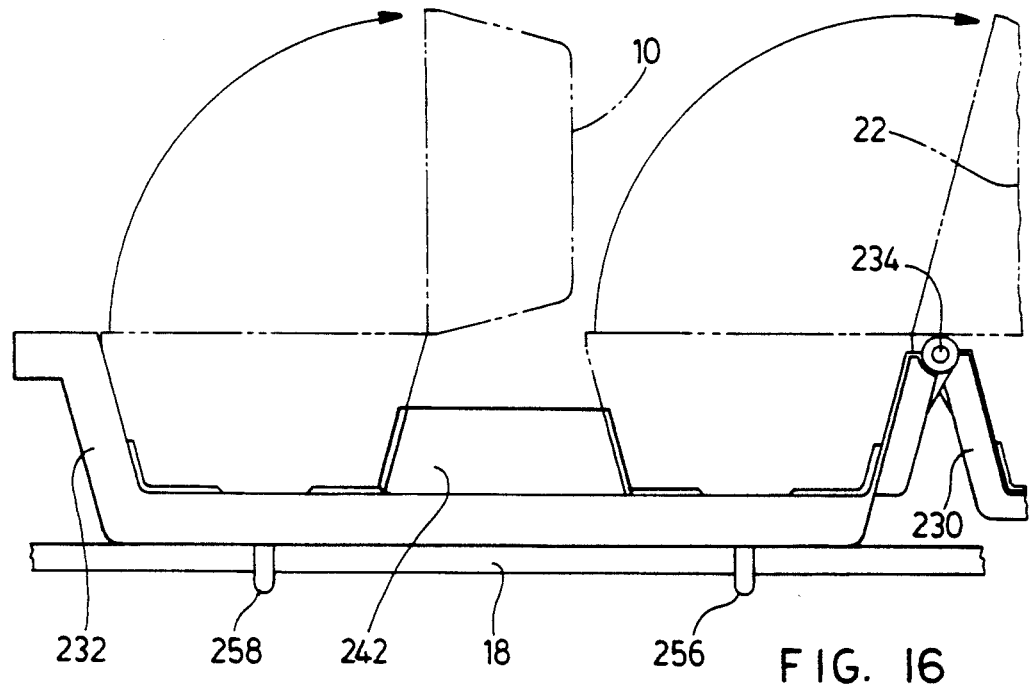

The forward ski case holder 14 will now be described. It comprises upper and lower rigid plastic members 230, 232 shaped to locate about the portion of the ski case 10 bearing the forward set 50 of grooves and ribs in an orientation transverse to its longitudinal axis 30. The case 12 is received and retained in a similar manner, and accordingly the description below will focus primarily on the retention of the case 10. A hinge 234 of conventional construction joins the holder portions and permits relative displacement between an open orientation (as in FIG. 1 or FIG. 16) in which the ski case 10 can be received or removed from between the holder portions and an closed orientation (FIGS. 13 and 14) in which the ski case is securely retained. In its open orientation, the holder 14 permits the cases 10, 12 to be opened individually to remove or receive skis. The rear holder 16 must of course be similarly oriented at such times.

The holder 14 is formed with a set 236 of alternating parallel grooves and ribs extending about inner surfaces of the two holder members 230, 232. These are shaped to interlock with the forward set 50 of grooves and ribs of the case when the holder 14 is closed to prevent displacement of the case relative to the holder 14 (as apparent in FIG. 14). It should be noted that the number of grooves and ribs associated with the forward set 50 is less than that associated with the holder 14. This permits the longitudinal position of the case to be adjusted relative to the holders 14, 16 as to change the distribution of weight on the vehicle roof. In that regard, it is preferable that a larger number of grooves and ribs be formed on the case portion than has been illustrated. A conventional key-operated lock 238 permits the case portions 22, 24 to be secured in a closed orientation and one alternative is a combination lock.

The holder 14 is configured to retain either the two cases 10, 12 of FIG. 1, each designed to receive a single pair of skis, or alternatively the larger case 220 of FIG. 3 adapted to hold two pairs of skis. To that end, the holder 14 comprises what might be regarded as a pair of partitioning or size-adjusting members 240, 242, one attached to the upper holder member 230, the other attached to the lower holder member 232. These are formed preferably of a dense elastomeric material. The lower partitioning member 242 which is typical will be described.

Figure 15:
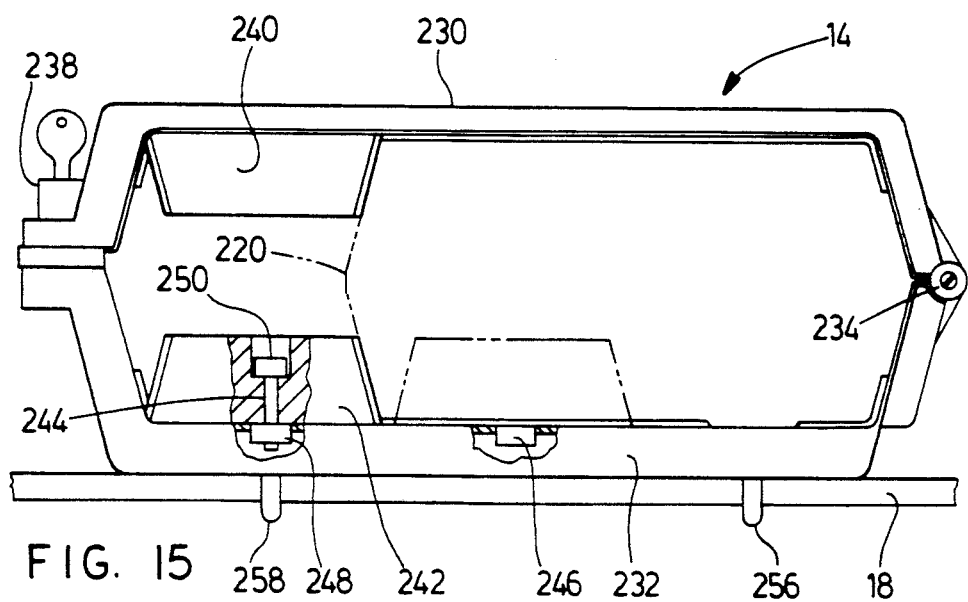
FIGS. 15 and 16 are cross-sectional views showing the ski case holder in closed and open orientations, respectively.

The lower partitioning member 242 can be positioned at three different locations on the lower holder member 232. To that end, the lower partitioning member 242 is formed with a vertical passage 244 which can be aligned with the threaded passage in any one of three nuts fixed to the lower holder member 232. Only a central nut 246 and a leftmost nut 248 are apparent in FIG. 15, the third nut being located at an extreme right position. A bolt 250 can be inserted into the passages of the partitioning member 242 are screwed into any appropriate one of the nuts. The three positions in which the partitioning member 242 can be located accordingly include a central position along the lower holder member 232 in which the interior of the case is divided into two sections conforming generally to the peripheral dimensions of the single-unit cases 10, 12. The other two positions are at extreme ends of the lower holder member 232 where the partitioning member 242 effectively sizes the interior of the holder 14 to define a single compartment appropriate for the double-unit larger case 220.

The lower partitioning member 242 has two sets 252, 254 of parallel alternating grooves and ribs positioned on opposing sides thereof. These sets 252, 254 of grooves and ribs are shaped to interlock with a portion of the locking structure of both smaller cases 10, 12 when the partitioning member 242 is positioned centrally along the lower holder portion. In an extreme position, as in FIG. 15, one set 254 of such grooves and ribs mates with part of a forward set of alternating parallel grooves and ribs of the larger case 220. Accordingly, whether one or two smaller cases 10, 12 or the single larger case 220 is retained within the holder 14, the case is fully interlocked with the holder 14 on all sides. Although only a single partitioning member is sufficient for purposes of the invention, it is strongly preferred to provide two such members on opposing sides of the casing interior. The second upper partitioning member 240 can be mounted at three corresponding locations to the upper holder member 230 in an analogous manner, except that, for esthetic reasons, it may be desirable not to extend threaded passages or other screw-receiving means fully to the outer surface 44 of the upper holder member 230. The upper partitioning member 240 interlocks with the single-or double-unit cases in essentially the same manner as the lower partitioning member 242, when the holder members 230, 232 are closed.

The forward holder 14 is adapted to be secured to the cross-members 18 of the vehicle roof rack. To that end, a pair of U-shaped clamps 256, 258 are provided with threaded end portions. The lower holder member 232 is formed with two identical compartments 260, 262 which open into the interior of the holder 14. The compartment 260 which is typical has a longitudinal slot 264 (relative to the longitudinal axis of the received case) which receives the threaded ends of the clamp 256 when the latter has been fitted about the roof rack member 18. A pair of wing-nuts 266, 268 permit the threaded ends of the clamp 256 to be secured to the lower holder member 232. The longitudinal slots which receive the clamps 256, 258 permit adjustment of the longitudinal position of the holder 14 relative to the vehicle and consequently relative to the holder 14 (which is mounted in an identical manner to the rear roof rack member 20). This permits fine adjustment of the separation of the holders 14, 16 to accommodate the separation of the forward and rear sets of alternating grooves and ribs of the cases. It will also be appreciated that each of the compartments 260, 262 of the holder 14, where the wing-nuts 266, 268 are located, are concealed when the cases 10, 12 are inserted into the holder 14. This arrangement impedes removal of the holders 14, 16 from the rack and provides a measure of security.

It will be appreciated that particular embodiments of the invention have been described and that modifications may be made therein without departing from the spirit of the invention or necessarily departing from the scope of the appended claims.

I claim:

1. A case for retaining a pair of skis and a pair of ski poles, each ski having a bent forward end portion, a central portion having a binding comprising toe and heel pieces for receipt of a ski boot, and a relatively straight rear end portion, each of the ski poles having one end portion bearing a basket and an opposing end portion bearing a handle, the case comprising:
    a pair of elongate rigid case portions shaped to define an elongate compartment dimensioned to contain the skis;
    means for joining the case portions and permitting relative displacement of the case portions between open and closed orientations;
    means for releasably securing the case portions in their closed orientation;
    means attached to the case for releasably retaining the skis within the compartment in substantially parallel relationship and oriented in opposite directions with the forward bent end portions of the skis in transversely overlapping relationship;
    means attached to the case for releasably retaining the poles within the compartment in planes in side-by-side spaced-apart relationship between the inserted skis with lengthwise axes of the poles in substantially an X configuration crossing over proximate to the bindings of the skis when viewed perpendicular to the planes with the basket-bearing end portion of each pole directed inwardly into the space between the retained skis, and with the handle of each pole inset longitudinally from both the handle and the basket of the other pole and proximate to the space between the skis.

2. The case of claim 1 in which the means for retaining the skis are configured to receive and retain the skis with the bindings of the skis in nested relationship.

3. The case of claim 2 in which the means for retaining the skis comprise means attached to one of the case portions and defining a pair of longitudinal pockets each configured to receive one of the skis edgewise into the pocket and to locate about opposing faces of the received ski.

4. The case of claim 3 in which the means for retaining the skis comprise means attached to the one case portion and positioned between the pockets for engaging opposing surfaces of the bindings of each of the skis received within the pockets such that longitudinal displacement of the skis relative to the pockets is prevented.

5. The case of claim 1 in which:
    the means for retaining the skis comprise a pair of pockets attached to one of the case portions and each configured to receive one of the skis edgewise into the pocket and to locate about opposing faces of the received ski;
    the means for retaining the poles comprise a multiplicity of clips secured to the other of the case portions.

6. A case for retaining a pair of skis, each ski having a bent forward end portion, a central portion having a binding comprising a toe piece and a heel piece fixed thereto for receipt of a ski boot, and a relatively straight rear end portion, the case comprising:
    a pair of rigid case portions shaped to define an elongate compartment dimensioned to contain the skis and having a longitudinal axis;
    means for joining the case portions and permitting relative displacement of the case portions between open and closed orientations;
    means for releasably securing the case portions in their closed orientation;
    one of the case portions comprising means defining within the compartment a pair of longitudinally-directed pockets, the pockets being configured to receive the skis oriented in opposite directions and in substantially parallel relationship with the bent forward end portions of the skis in transversely overlapping relationship, each pocket having an open longitudinal side permitting insertion of one of the skis edgewise into the pocket and an opposing obstructed longitudinal side, each pocket comprising a pair of pocket portions, each pocket portion being shaped to locate about opposing faces of the ski inserted into the pocket comprising the pocket portions, each pair of pocket portions being spaced-apart longitudinally such that the binding of the inserted ski can be spaced forwardly from one of the pair of pocket portions and spaced rearwardly of the other of the pair of pocket portions, the pockets being open-ended and dimensioned longitudinally such that the forward bent end portions of the inserted skis are located outwardly of an open end of their respective pockets; and,
    displacement-preventing means for preventing displacement of the inserted skis relative to the pockets, the displacement-preventing means comprising binding-engaging means attached to the one case portion between the pockets for engaging the bindings of the inserted skis such that longitudinal displacement of the skis relative to the pockets is prevented, the binding-engaging means comprising stationary structure portions attached to the one case portion case portion between the pockets and positioned such that one axial end of the binding of each of the inserted skis can be abutted against the stationary structure portions, a pair of movable members, and means fixed to the one case portion between the pockets and permitting each of the movable members to be displaced manually from within the one case portion into engagement with a second axially opposing end of a different one of the bindings of each of the inserted skis and fixed relative to the case after such engagement, the displacement-preventing means further comprising structures attached to the other of the case portions and positioned to firmly engage a side edge of each ski inserted in the pockets when the case portions are displaced from their open orientation to their closed orientation thereby to press the inserted skis into their respective pockets.

7. The ski case of claim 6 in which the stationary structure portions are positioned such that a rear surface of the toe piece of the binding of each ski can be abutted against the structure portions when the skis are inserted into their respective pockets, the means permitting displacement and fixing of the movable members being configured to permit at least axial displacement of the movable members into contact with forward surfaces of the toe pieces.

8. The ski case of claim 6 in which:
each of the movable members is formed with an elongate shank portion;
the means permitting displacement and fixing of the movable abutment members comprise a pair of structures each defining a multiplicity of longitudinally spaced-apart slots, one of the pair of structures being positioned proximate to one of the pockets and the other of the pair of structures being positioned proximate to the other of the pockets, the slots of the pair of structures being shaped to receive and retain the shank portions of the movable members.

9. The ski case of claim 6 adapted for use with a pair of ski poles, each pole having one end portion bearing a basket and an opposite end portion bearing a handle, the case comprising means attached to the case for releasably retaining the poles within the compartment in planes in side-by-side spaced-apart relationship between the inserted skis with lengthwise axes of the poles in substantially an X configuration crossing over proximate to the bindings of the skis when viewed perpendicular to the planes with the basket-bearing end portion of each pole directed inwardly into the space between the retained skis, and with the handle of each pole inset longitudinally from both the handle and the basket of the other pole and proximate to the space between the skis.

10. The ski case of claim 9 in which the pole-retaining means comprise a multiplicity of clips shaped to receive the ski poles and attached to the case.

11. The ski case of claim 6 in which the pockets are spaced to receive the skis with the bindings of the skis in transversely nested relationship.

12. The ski case of claim 6 in which:
the case comprises a circumferential sidewall, a handle, and a recessed portion formed in the sidewall;
the handle comprises:
a generally U-shaped handle portion with a pair of generally parallel arm portions,
a pair of elongate handle extension portions,
first hinge means connecting one end of each handle extension portion to a different one of the arm portions such that the U-shaped handle portion pivots about a first predetermined axis relative to the handle extension portions,
second hinge means connecting an opposite end of each of the handle extensions to the case proximate to the recessed case portion such that the opposite ends of the handle extensions pivot together about a second predetermined axis parallel to the first predetermined axis, and first spring means cooperating with the first hinge means and a second spring means cooperating with the second hinge means to urge the U-shaped handle portion and the pair of handle extension portions towards the recessed case portion;
the recessed case portion is shaped to seat the U-shaped handle portion and the pair of handle-extension portions substantially flush with the outer surface of the sidewall.

13. The ski case of claim 6 in combination with a holder for using securing the ski case to another structure for transportation or storage, in which:
the holder is shaped to locate about a portion of the ski case in an orientation transverse to a longitudinal axis, the holder comprising:
first and second holder portions,
means joining the holder portions and permitting relative displacement of the holder portions between an open orientation in which the ski case can be received between and removed from the holder portions and a closed orientation,
means for releasably securing the holder portions in their closed orientation against relative displacement to their open orientation, and
means for use in securing the holder to the other structure;
the ski case portion and the holder are formed with structures shaped to interlock when the holder portions are displaced to their closed orientation about the ski case thereby preventing displacement of the ski case relative to the holder.

14. The ski case and holder combination of claim 13 in which the interlocking structures comprise a projection formed in one of the ski case portion and the holder and a recess formed in the other of the ski case portion and the holder and shaped to receive the projection.

15. The ski case and holder combination of claim 14 adapted to secure the skis to a vehicle comprising a roof rack which includes an elongate roof rack member, in which:
the means for use in securing the holder to another structure comprise a clamp shaped to fit about the elongate roof rack member;
one of the holder portions is shaped to seat on an upper surface of the elongate roof rack member, the one holder portion being apertured to receive a portion of the clamp when the clamp has been fitted about the elongate roof rack member;
the means for securing the holder to the vehicle comprise means releasably securable to the clamp portion when received by the one holder portion to prevent removal of the clamp portion from the one holder portion such that the holder is secured to the roof rack member;
the holder portion being apertured at such a location that the ski case retained in the holder obstructs access to the means releasably securable the clamp portion; and,
the means for releasably securing the holder portions against relative displacement in their closed orientation comprise a key-operated or combination lock.

* * * * *